United States Patent [19]

Barry

[11] 4,099,811

[45] Jul. 11, 1978

[54] BENCH FOR POTTING OF PLANTS AND THE LIKE

[76] Inventor: Fentress S. Barry, 2000 Arrow La., Riverwoods, Ill. 60015

[21] Appl. No.: 799,458

[22] Filed: May 23, 1977

[51] Int. Cl.² .............................................. A47B 81/00
[52] U.S. Cl. .................................... 312/211; 312/279; 108/25
[58] Field of Search .................. 108/25; 312/211, 196, 312/195, 278, 279, 265, 263; 232/43.1

[56] References Cited

U.S. PATENT DOCUMENTS

| 527,030 | 10/1894 | Thompson | 312/279 |
|---|---|---|---|
| 561,462 | 6/1896 | Wheeler | 312/279 X |
| 1,244,474 | 10/1917 | Cowles | 312/278 X |
| 1,402,462 | 1/1922 | Wernz | 312/278 X |
| 1,508,259 | 9/1924 | Stafford | 312/195 |
| 1,621,491 | 3/1927 | Burke | 312/279 X |
| 2,829,938 | 4/1958 | Rose | 312/279 X |
| 3,589,784 | 6/1971 | Winkles | 312/263 |

Primary Examiner—Francis K. Zugel
Attorney, Agent, or Firm—Garrettson Ellis

[57] ABSTRACT

A bench for potting plants and the like which comprises a frame having side walls and a rear wall, and which also defines a horizontal working surface. A storage bin is rearwardly positioned on the bench above the working surface, having an openable top and a front wall. The front wall is carried by the side walls in vertically slidable relationship to define a variable sized opening between the front wall and the horizontal working surface, to provide access to material in the storage bin. Means are provided for retaining the front wall in a predetermined positioned to maintain the access opening at a desired height.

4 Claims, 2 Drawing Figures

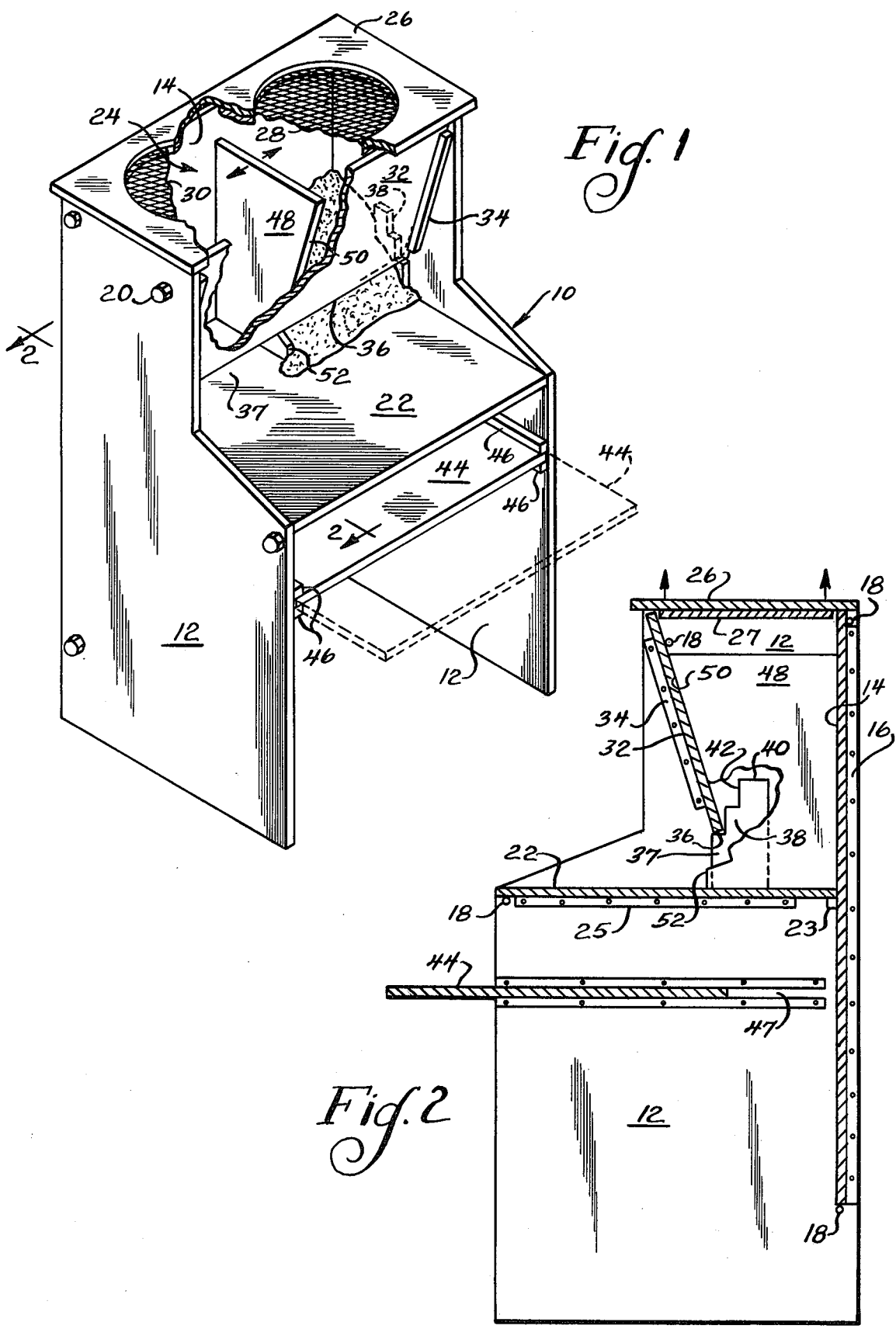

BENCH FOR POTTING OF PLANTS AND THE LIKE

BACKGROUND OF THE INVENTION

Amateur and professional indoor gardeners are frequently involved with potting and repotting plants utilizing various types of soil media, for example, leaf mold, soil, sand, vermiculite, peat, chunks of bark, charcoal, and bone meal, used in various proportions and combinations.

The invention of this application is a bench for the efficient and clean storage and dispensing of the various types of soil or potting media, to permit the user to draw soil media from a conveniently positioned access site communicating with a substantial storage receptacle for the soil media, while at the same time providing an elevated work space for the potting operation.

Furthermore, various types of soil media are best dispensed through variable sized apertures. For example, sand will tend to spill out of an aperture which is much larger than 2 inches in height in an uncontrolled manner. General soils are most conveniently dispensed through an aperture of about 4 inches in height. Bark for orchid growers and the like generally most conveniently utilizes an aperture of about 6 or 8 inches in height.

The dispensing bench of this application provides a variable dispensing capability at the work site for any type of soil medium or media which may be desired, by simple adjustment of the dispensing means.

DESCRIPTION OF THE INVENTION

In accordance with this invention, a bench for placing particulate matter into receptacles, such as a potting bench, is provided, which comprises a frame having side walls and a rear wall. The bench also defines a horizontal working surface. A storage bin is rearwardly positioned above the working surface, having an openable top for loading of particulate matter into the storage bin, and a front wall. The front wall is carried by the side walls in vertically slidable relationship, to define a variable sized opening between the front wall and the horizontal working surface to provide access to material in the storage bin.

Means for retaining the front wall in a predetermined position are provided to maintain the opening at a desired height.

Preferably, the side walls may be connected together by rod members under tension, to bias the side walls against the horizontal working surface. This provides great strength to the structure of this invention, which is capable of carrying heavy weights of soil or other such material without weakening or flexing.

The retaining means may simply comprise a separate, polygonal structure such as a cut piece of plywood which defines several sides of differing length to provide variable spacings of, for example 2, 3, 4, 6 and 8 inches respectively. These, in turn, may be used to prop the front wall in an elevated position of any of those distances above the working surface, to provide a desired opening for access to the particulate material.

Referring to the drawings,

FIG. 1 is a perspective view, with portions broken away, of a potting bench made in accordance with this invention.

FIG. 2 is a sectional view taken along line 2—2 of FIG. 1.

Referring to the drawings, potting bench 10 is provided, being made for example of three-quarter inch plywood.

Bench 10 defines a frame having side walls 12, and a rear wall 14, which may be secured together in conventional manner, and particularly by the use of cleat 16, which may be a rectangular length of wood at both rear corners between rear wall 14 and side walls 12.

Furthermore, four rod members 18 secure the respective side walls 12 together under tension. The rod members 18 are retained to the side walls 12 by nuts 20.

A horizontal piece of plywood 22 defines the horizontal working surface, and is positioned between side walls 12 so that the side walls are biased under tension against the working surface 22 by the action of rod members 18, for strengthening of the structure. As shown in FIG. 2, one of the rod members 18 is positioned underneath the front of horizontal member 22 for its support, while cleat 23, attached to rear wall 14, supports the rear of member 22. Cleats 25, carried by side walls 12, support the sides of member 22.

Another of rod members 18 supports the bottom of rear wall 14.

A storage bin 24 is provided, having an openable top 26, which may simply be a solid, plywood top or, as shown, an apertured plywood top with screens 28, 30 being respectively positioned across the apertures. Soil or other particulate material may be dumped through the screens 28, 30, if desired, to remove oversized materials from the products to be stored in the bench. Top 26, also has a second smaller lower layer 27, to secure the screens between the two layers.

Storage bin 24 is further defined by a front wall 32, which is carried and retained between side walls 12 by cleat members 34 upon each side wall, plus one of the rod members 18, to define a confined sliding track means for front wall 32. Aperture 37 is defined between horizontal surface 22 and bottom edge 36 of front wall 32.

The bottom edge 36 of the front wall 32 may rest upon separate, polygonal structures 38 positioned adjacent side walls 12. Polygonal structures 38 may be cut out of plywood in the shape shown to provide a plurality of sides of differing length. Accordingly, depending upon which part of the polygonal structure is placed between the bottom edge 36 of the front wall 32 and horizontal member 32, the height of aperture 37 can be varied.

In the position as shown of structure 38 in FIG. 2, a height of 4 inches for aperture 37 is achieved, which is a good height for dispensing of general soil materials.

If it were desired to dispense rough bark, edge 40 of structure 38 could be placed under bottom edge 36 of front wall 32, with removable top 26 being lifted out of the way, to provide a eight-inch height for the aperture 37.

If a two-inch aperture 37 is desired, member 38, which may be unattached to walls 12, can be rotated clockwise by 90°, and edge 42 would be placed between lower edge 36 and horizontal member 22.

Other spacing dimensions that can be provided are 3 inches and 6 inches, by the use of appropriate sections of member 38.

Bench 10 also defines a sliding lower shelf 44, which may be pulled out for access to the contents as illustrated in phantom lines in FIG. 1. Shelf 44 is carried by a horizontal track defining member positioned on each of the side walls 12. Each track defining member comprises a pair of horizontal, spaced cleat members 46 within which shelf member 44 can slide. Shelf member 44 is made about ⅛ inch narrower than the horizontal member 22, to facilitate the sliding. Because cleats 46 are placed above and below the shelf member to define track 47, shelf member 44 does not tip when it is drawn outwardly for access to the contents thereof.

If desired, one or more vertical partitions 48 may be inserted into the storage bin to divide the bin into individual chambers for different types of particulate storage materials, for example peat and soil. If desired, part of the lower edge 36 of front wall 32 may be cut away adjacent one of the chambers defined by a vertical divider 48 to provide a higher aperture 38 for that individual chamber, than the aperture of the other chamber. This permits the storage of bark or the like in one chamber and soil in the other, or perhaps sand in one and soil in another.

Partition 48 defines a sloping, forward surface 50, matching the inward slope defined in forward wall 32, plus a foot member 52 projecting forwardly.

It may be desirable for the mesh size of screens 28, 30 to be different to suit the projected requirements of each individual chamber as defined by the partition means 48.

The potting bench of this invention provides the user with ready, relatively large amounts of potting materials of any desired type, which may be dispensed out of a variable height aperture for efficient and clean potting activities. The bench is especially sturdy because of the particular construction utilized, and is easily refillable with potting materials as needed.

The above has been offered for illustrative purposes only, and is not intended to limit the scope of the invention of this application, which is as defined in the claims below.

That which is claimed is:

1. A bench for placing particulate matter into receptacles, such as a potting bench, which comprises:
a frame having side walls and a rear wall, which frame defines a horizontal working surface, a storage bin rearwardly positioned above said working surface, having an openable top and a front wall, said front wall being carried by said side walls in vertically slidable relationship to define a variable sized opening between said front wall and the horizontal working surface to provide access to material in said storage bin, and means for retaining said front wall in a predetermined position to maintain said opening at a desired height, said retaining means comprising a separate polygonal structure defining a plurality of sides of differing length, said polygonal structure being positioned between said horizontal working surface and the bottom of said slidable front wall, said side walls being connected together by rod members under tension to bias said side walls against the horizontal working surface for strengthening of the bench and said front wall being positioned whereby its lower edge is positioned rearwardly of its upper edge.

2. The bench of claim 1 in which vertical partition means are positioned in said storage bin to divide said bin into individual chambers.

3. The bench of claim 2 in which an aperture including a screen member is defined in said openable top over each individual chamber.

4. The bench of claim 2 in which a lower sliding shelf is defined below said working surface, and a horizontal track-defining member positioned on each side wall and proportioned to receive said lower sliding shelf whereby said track-defining members permit horizontal sliding of said shelf without vertical tipping.

* * * * *